(12) United States Patent
Kishimoto

(10) Patent No.: US 6,445,464 B1
(45) Date of Patent: Sep. 3, 2002

(54) IMAGE PROCESSING METHOD AND APPARATUS

(75) Inventor: Masaki Kishimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/235,066

(22) Filed: Jan. 21, 1999

(30) Foreign Application Priority Data

Jan. 23, 1998 (JP) .......................................... 10-011497

(51) Int. Cl.[7] ................................................ H04N 1/40
(52) U.S. Cl. ........................................ 358/1.9; 382/251
(58) Field of Search ........................ 358/1.9, 447, 458, 358/455–456; 382/251–253, 237

(56) References Cited

U.S. PATENT DOCUMENTS

| | | | | |
|---|---|---|---|---|
| 5,072,290 A | * | 12/1991 | Yamagami et al. | 358/13 |
| 5,467,201 A | * | 11/1995 | Fan | 358/447 |
| 5,696,846 A | * | 12/1997 | Shimizaki | 382/254 |
| 6,115,421 A | * | 9/2000 | Katta et al. | 375/240 |

* cited by examiner

Primary Examiner—Thomas D. Lee
Assistant Examiner—Stephen Brinich
(74) Attorney, Agent, or Firm—Crosby, Heafey, Roach & May

(57) ABSTRACT

An image processing method and an image processing apparatus are provided for maintaining image quality through simple processing while reducing the number of gradation levels of image data by error diffusion processing. In an image processing apparatus, data outputted from a filter is subtracted from input image data $x(i, j)$ at a first subtracter. Data outputted from the subtracter is quantified at a quantifier. Data outputted from the quantizer is outputted as output image data $y(i, j)$. Furthermore, the data outputted from the subtracter is subtracted from the data outputted from the quantizer at a second subtracter to produce quantization error $e_0(i, j)$. At a quantization error converter, quantization error $e_0(i, j)$ is converted into quantization error $e_1(i, j)$ within a specific range determined for each quantization level, based on the quantization level after quantization at the quantizer. Quantization error $e_1(i, j)$ is inputted to the filter. Data outputted from the filter is inputted to the first subtracter.

10 Claims, 13 Drawing Sheets

IMAGE PROCESSING METHOD AND APPARATUS

BACKGROUND OF THE INVENTION

1. Field of the Invention

The present invention relates to an image processing method and apparatus for reducing the number of gradation levels of image data through performing error diffusion processing.

2. Description of the Related Art

For outputting an image with a multiple-level gradation obtained through a computer or an image input device, for example, through an image output device such as a printer with a fewer gradation levels, the number of gradation levels of the image data is required to be reduced. Pseudo halftone representation has been utilized for maintaining the quality of an original image while reducing the number of gradation levels. Among several methods of the pseudo halftone representation, an error diffusion method capable of producing a high-quality image has been widely used for printers that generate two levels of output gradation, for example. The error diffusion method is a method of diffusing a quantization error resulting from a target pixel into input image data of unquantized pixels near the target pixel.

The general principle of the error diffusion method will now be described in detail with reference to Hitoshi Takaie and Mitsuo Yae, 'Gradation Conversion Technique of Digital Image Data with C', in Interface, August 1993, pp. 158–171.

The error diffusion method is to represent pseudo halftones through modulating quantization errors into high frequencies to be less perceptible considering a characteristic of human visual perception. FIG. 1 is a block diagram of an image processing apparatus for implementing typical error diffusion processing. The image processing apparatus comprises: a subtracter 111 for subtracting output data of a filter 114 described below from input image data x (i, j); a quantizer (shown as Q) 112 for quantizing output data of the subtracter 111 and outputting the result as output image data y (i, j); a subtracter 113 for subtracting output data of the subtracter 111 from output image data y (i, j); and the filter 114 for performing specific filtering on the output data of the subtracter 113 and outputting the result to the subtracter 111. In the drawing, e (i, j) represents a quantization error produced through quantization at the quantizer 112. Therefore the output data of the subtracter 113 is quantization error e(i, j). Coordinates of two directions intersecting each other are represented by 'i' and 'j', respectively. The two directions will be called i direction and j direction, respectively.

The filter 114 is a sort of linear filter. The transfer function thereof is determined to be G ($z_1$, $z_2$). $Z_1$ and $z_2$ are variables in z transformation in i direction and j direction, respectively. The overall configuration of the image processing apparatus shown in FIG. 1 is regarded as a two-dimensional delta-sigma modulation circuit. Therefore expression (1) below is given for the relationship of input and output in the image processing apparatus.

$$Y(z_1, z_2) = X(z_1, z_2) + H(z_1, z_2) E(z_1, z_2) \quad (1)$$

In expression (1), $Y(z_1, z_2)$, $X(z_1, z_2)$ and $E(z_1, z_2)$ are values produced through z transformation of y(i, j), x(i, j) and e(i, j), respectively. Transfer function $H(z_1, z_2)$ of the filter for modulating quantization error $E(z_1, z_2)$ is given by expression (2) below.

$$H(z_1, z_2) = 1 - G(z_1, z_2) \quad (2)$$

The transfer function $H(z_1, z_2)$ represents a high-pass filter of two-dimensional finite impulse response (FIR). The high-pass filter is a filter for modulating quantization errors which determines a modulation characteristic of quantization error $E(z_1, z_2)$ modulated to a higher frequency. In the following description filters indicated with transfer functions $H(z_1, z_2)$ and $G(z_1, z_2)$ are shown as filter $H(z_1, z_2)$ and filter $G(z_1, z_2)$, respectively.

$G(z_1, z_2)$ is given by expression (3) below.

$$G(z_1, z_2) = \Sigma\Sigma g(n1, n2) \, z_1{-n^1} z_2{-n^2} \quad (3)$$

The first $\Sigma$ in expression (3) indicates a sum when n1 is from $-N_1$ to $M_1$. The second $\Sigma$ in expression (3) indicates a sum when n2 is from $-N_2$ to $M_2$. Each of $N_1$, $M_1$, $N_2$ and $M_2$ is a positive integer. A filter coefficient is given by g(n1, n2) and a target pixel by n1=0 and n2=0.

A typical filters as an example of g(i, j), the coefficient of $G(z_1, z_2)$, is given by expression (4) below. The * in the expression represents a target pixel where g(0, 0)=0.

$$g(i, j) : \begin{pmatrix} * & 7 & 5 \\ 3 & 5 & 7 & 5 & 3 \\ 1 & 3 & 5 & 3 & 1 \end{pmatrix} \Big/ 48 \quad (4)$$

FIG. 2 shows the frequency characteristic of error modulation filter $H(z_1, z_2)$ using filter $G(z_1, z_2)$ given by expression (4). A greater absolute value of frequency indicates a higher frequency in FIG. 2. Filter $G(z_1, z_2)$ and filter $H(z_1, z_2)$ using filter $G(z_1, z_2)$ given by expression (4) are called filters of Jarvis, Judice & Ninke (referred to as Jarvis' filter in the following description).

However, the error diffusion method of related art as described above has the following two problems. The first problem is that generation of dots is long delayed in the rising part of the highlight region (where dots are sparse) while generation of white dots (dot-like portions surrounded by dots where there is no dot) is long delayed in the rising part of the shadow region (where dots are dense). Such a phenomenon is called dot delay phenomenon in the present invention.

The second problem is that dots are missing like tailing in the portion near the interface between the region (the shadow region, for example) other than the highlight region and the highlight region. Similarly, white dots are missing like tailing in the portion near the interface between the region (the highlight region, for example) other than the shadow region and the shadow region. Such a phenomenon is called tailing phenomenon in the present invention.

Reference is now made to FIG. 3 and FIG. 4 for describing a typical example of an image where the above-described dot delay phenomenon and tailing phenomenon occur. FIG. 3 shows the original image. The range of gradation values of the original image is from '0' to '255'. The gradation value is '253' in the background highlight region and '2' in the rectangular shadow region in the center in the original image. The gradation value of the light oblique line drawn in the bottom right portion of the shadow region is '210' to '240' in the original image. FIG. 4 shows the image produced through performing the error diffusion processing on the original image shown in FIG. 3 by the image processing apparatus shown in FIG. 1 so that the gradation levels are reduced to two. A Jarvis' filter is used as the error modulation filter in the error diffusion processing. The processing is performed from left to right in the primary scanning direction and from top to bottom in the secondary scanning direction.

In the image on which the error diffusion processing has been performed shown in FIG. 4, no dot is generated in the top part and the left part of the background where dots are to be evenly generated. This is the dot delay phenomenon. Since the error diffusion processing has been performed from left to right in the primary scanning direction and from top to bottom in the secondary scanning direction in the example shown in FIG. 4, dot generation is delayed in the top part and the left part and there are regions with no dots. The same applies to the rectangular shadow region in the center where generation of white dots is delayed in the top end part and the left end part. In the example shown in FIG. 4, in particular, no white dot is generated in the region from the top end part and the left end part through the part near the bottom right portion in the shadow region.

In the image shown in FIG. 4, there is a region where dots are missing like tailing in the bottom right part of the rectangular shadow region in the center. This is the tailing phenomenon. Part of the oblique line drawn in the bottom right part of the shadow region is missing in the image shown in FIG. 4, due to the tailing phenomenon.

Such dot delay phenomenon and tailing phenomenon significantly reduce the image quality as shown in FIG. 4.

The cause of the dot delay phenomenon and tailing phenomenon will now be described. The threshold value of the quantizer 112 is '128' or '127' when error diffusion processing is performed, using the image processing apparatus shown in FIG. 1, so as to reduce the quantization levels of input image data to two levels of '0' and '255'. The threshold value of the quantizer 112 is '128' in the following description.

The magnitude (absolute value) of error e(i, j) produced at the quantizer 112 is a value as small as '2' when the gradation value of input image data x(i, j) is '2' as in the shadow region of the original image shown in FIG. 3 or when the gradation value of input image data x(i, j) is '253' as in the highlight region of the original image. The small error produced at the quantizer 112 is diffused into neighboring pixels in accordance with filter coefficient g(i, j) of expression (4) and further reduced to a smaller value. Such small errors of a number of pixels are accumulated. When the number of accumulated errors exceeds the threshold value '128' of the quantizer 112 (or reaches '128' or above), a dot or a white dot first appears Accordingly, the cause of the dot delay phenomenon and the tailing phenomenon may be described as follows.

The cause of the dot delay phenomenon is that it takes a long period of time to accumulate errors so that the errors reaches the threshold value since the quantization error produced in each pixel is small in the highlight region or the shadow region.

The cause of the tailing phenomenon is as follows. Quantization errors accumulated in a specific region remain after processing of the region is completed. If the region shifts to the highlight region or to the shadow region, the quantization error produced in each pixel is small as in the case of the dot delay phenomenon. As a result, it takes a long period of time to cancel out the errors accumulated in the specific region.

As thus described, the cause of the dot delay phenomenon and the tailing phenomenon is the same. That is, the dot delay phenomenon and the tailing phenomenon are two sides of the single problem.

In order to overcome the dot delay phenomenon and the tailing phenomenon described above, the optimized threshold error diffusion method has been proposed, as disclosed in Toshiaki Kakutani 'Improved Error Diffusion Method for High Quality Output', Society of Photographic Science and Technology of Japan 1997 Annual Meeting Abstract, May 27–28, 1997, pp. 116–119.

The optimized threshold error diffusion method will now be briefly described. In the method attention is focused on the cause of the dot delay phenomenon and the tailing phenomenon described above. For reducing input image data whose gradation values range from '0' to '255' to data whose quantization levels are two of '0' and '255', the threshold value of the quantizer is not a fixed value such as '128' but a value close to the gradation value of the input image data. The period of time in which accumulated errors reach the threshold value is thereby reduced. To be specific, the optimized threshold error diffusion method is the method in which threshold Th of the quantizer is the linear function of input image data x(i, j) as represented by expression (5) below.

$$Th=\{x(i, j)\times(n-1)+128\}/n \quad (5)$$

where n is an integer.

FIG. 5 shows the relationship between the level of input image data and threshold Th where n is '12'.

Referring to FIG. 6 and FIG. 7, comparison is made between the image obtained by the typical error diffusion method and the image obtained by the optimized threshold error diffusion method. FIG. 6 shows the image obtained through reducing the input image data as shown in FIG. 3 to data whose quantization levels are two of '0' and '255' by the typical error diffusion method wherein the threshold value of the quantizer is '128'. FIG. 7 shows the image obtained through reducing the input image data as shown in FIG. 3 to data whose quantization levels are two of '0' and '255' by the optimized threshold diffusion method wherein 'n' of expression (5) is '12'. In either case a Jarvis' filter is used as the error modulation filter.

As shown in FIG. 7, the optimized threshold diffusion method resolves the dot delay phenomenon and the tailing phenomenon.

However, the edge of the rectangular shadow region in the center has jaggies in the image shown in FIG. 7. Since the optimized threshold diffusion method produces jaggies on edges of highlight regions and shadow regions, the method reduces the quality of an artificial image such as a character or a computer graphics image wherein a highlight region and a shadow region are distinct. The method causes a natural image to be blurred as well.

In 'Improved Error Diffusion Method for High Quality Output' mentioned above, a method is disclosed for optimizing the threshold value for each gradation value, providing a table of the relationship between the gradation values and the threshold values, and determining the threshold value for each gradation value, referring to the table, instead of the method wherein the threshold value of the quantizer is the linear function of input image data. However, although the threshold value is optimized in such a manner for the input image data as shown in FIG. 3, there is little difference between this method and the method wherein the threshold value is the linear function of input image data since the number of gradation values is small.

Since the optimized threshold diffusion method requires to refer to image input data for determining the threshold value of the quantizer, time required for reading data is doubled and processing time is increased.

The foregoing problems apply to mean error minimization, used instead of the error diffusion method, as a method of pseudo halftone representation as well. This is because the mean error minimization method and the error diffusion method are similar in that a quantization error resulting from a target pixel is diffused into input image data of unquantized pixels near the target pixel although the procedural steps of the methods are different from each other.

It is an object of the invention to provide an image processing method and apparatus for maintaining the image quality through simple processing while reducing the number of gradation levels of image data through performing error diffusion processing.

SUMMARY OF THE INVENTION

An image processing method of the invention comprises the steps of: quantizing input image data of each of pixels forming entire image data based on at least one threshold value so as to convert the input image data into output image data having any of at least two quantization levels; converting a quantization error resulting from quantizing the input image data of each of the pixels in the step of quantizing into a quantization error within a specific range determined for each of the quantization levels, based on the quantization level after quantization; and diffusing the quantization error obtained through conversion in the step of converting with respect to a targeted one of the pixels, into input image data of unquantized pixels near the target pixel.

An image processing apparatus of the invention comprises: a means for quantizing input image data of each of pixels forming entire image data based on at least one threshold value so as to convert the input image data into output image data having any of at least two quantization levels; a means for converting a quantization error resulting from quantizing the input image data of each of the pixels by the means for quantizing into a quantization error within a specific range determined for each of the quantization levels, based on the quantization level after quantization; and a means for diffusing the quantization error obtained through conversion by the means for converting with respect to a targeted one of the pixels, into input image data of unquantized pixels near the target pixel.

According to the image processing method of the invention, input image data of each of pixels is quantized in the step of quantizing, based on at least one threshold value and converted into output image data having any of at least two quantization levels. A quantization error resulting from quantizing the input image data of each of the pixels in the step of quantizing is converted in the step of converting into a quantization error within a specific range determined for each of the quantization levels, based on the quantization level after quantization. The quantization error obtained through conversion in the step of converting with respect to a targeted one of the pixels is diffused into input image data of unquantized pixels near the target pixel.

According to the image processing apparatus of the invention, input image data of each of pixels is quantized by the means for quantizing, based on at least one threshold value and converted into output image data having any of at least two quantization levels. A quantization error resulting from quantizing the input image data of each of the pixels by the means for quantizing is converted by the means for converting into a quantization error within a specific range determined for each of the quantization levels, based on the quantization level after quantization. The quantization error obtained through conversion by the means for converting with respect to a targeted one of the pixels is diffused into input image data of unquantized pixels near the target pixel.

Other and further objects, features and advantages of the invention will appear more fully from the following description.

DETAILED DESCRIPTION OF THE PREFERRED EMBODIMENTS

Figure 8:
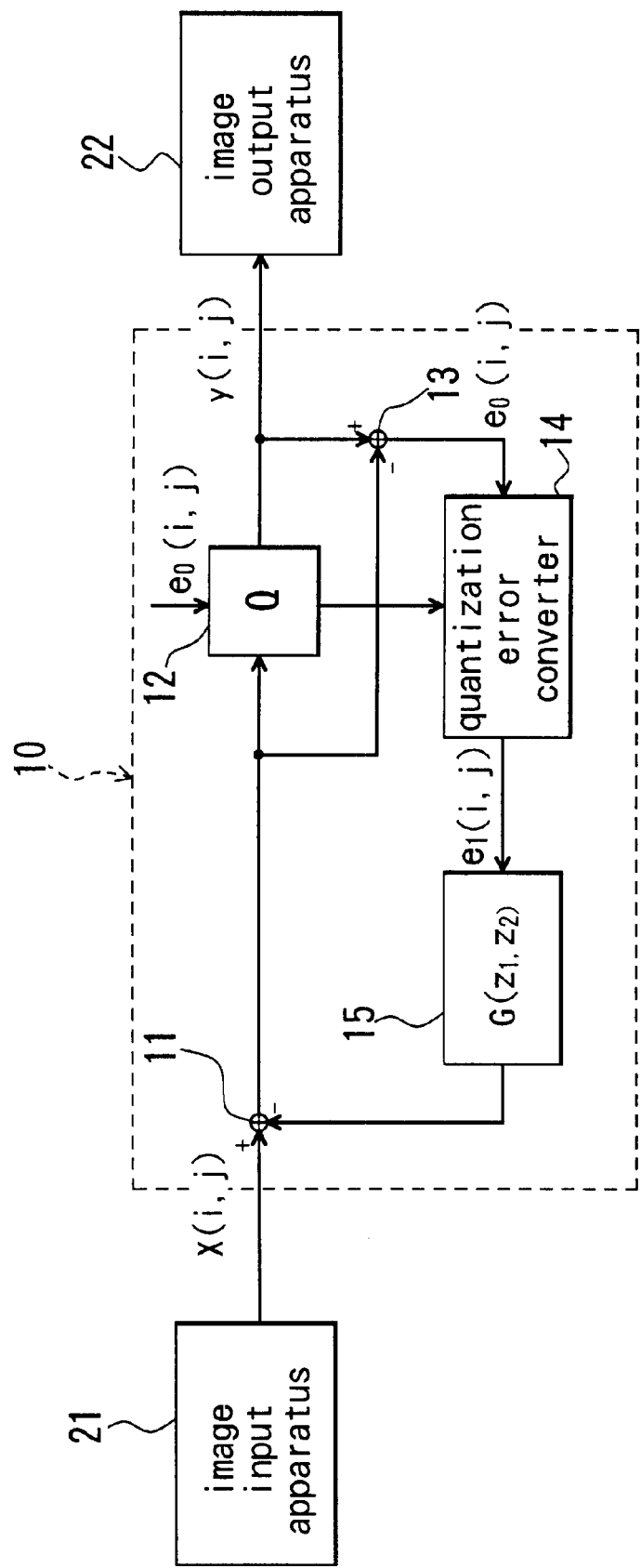
FIG. 8 is a block diagram of an image processing apparatus of a first embodiment of the invention.

Preferred embodiments of the invention will now be described in detail with reference to the accompanying drawings. FIG. 8 is a block diagram of an image processing apparatus for implementing an image processing method of a first embodiment of the invention. The image processing apparatus 10 comprises: a subtracter 11 for subtracting output data of a filter 15 described below from input image data x(i, j); a quantizer (shown as Q) 12 as a quantization means for quantizing the output data of the subtracter 11 for each pixel, based on at least one threshold value and converting the data into output image data y(i, j) having any of at least two quantization levels; a subtracter 13 for subtracting the output data of the subtracter 11 from the output data of the quantizer 12 and producing quantization error $e_0(i, j)$; a quantization error converter 14 as a means for converting quantization error $e_0(i, j)$ of each pixel outputted from the subtracter 13 into quantization error $e_1(i, j)$ of a value within a specific range determined for each quantization level in accordance with the quantization level after quantization; and the filter 15 for performing specific filtering processing on the output data of the quantization error converter 14 and outputting the data to the subtracter 11. From the quantizer 12 the quantization error converter 14 receives information of the quantization level after quantization for each pixel.

The filter 15 is a sort of linear filter. The transfer function thereof is determined to be $G(z_1, z_2)$. $z_1$ and $z_2$ each represents a variable in z transformation with regard to i direction and j direction, respectively. $G(z_1, z_2)$ is represented by expression (3) described above. The filter 15 may be implemented by a digital filter, for example.

The filter 15 and the subtracter 11 correspond to means for diffusing quantization error $e_1(i, j)$ into which the quantization error of a target pixel is converted at the converter 14 into input image data x(i, j) of an unquantized pixel near the target pixel.

Input image data x(i, j) inputted to the image processing apparatus 10 may be provided from an image input apparatus 21. Output image data y(i, j) outputted from the image processing apparatus 10 may be outputted to an image output apparatus 22. The image input apparatus 21 may be any of an image scanner, a digital camera, a video camera and so on. The image output apparatus 22 may be any of a printer, a liquid crystal display and so on.

In the embodiment of the invention, in particular, the range of gradation values of input image data x(i, j) is from '0' to '255'. The quantizer 12 quantizes output data of the subtracter 11 based on a single threshold value '128' and converts the data into output image data y(i, j) having either of two quantization levels of '0' and '255'. If output data of the subtracter 11 is equal to the threshold value '128', the quantization level of output image data y(i, j) is '255'.

At the quantization error converter 14 the conversion characteristic from quantization error $e_0(i, j)$ to quantization error $e_1(i, j)$ is defined for each of the quantization levels of '0' and '255'.

Figure 9:
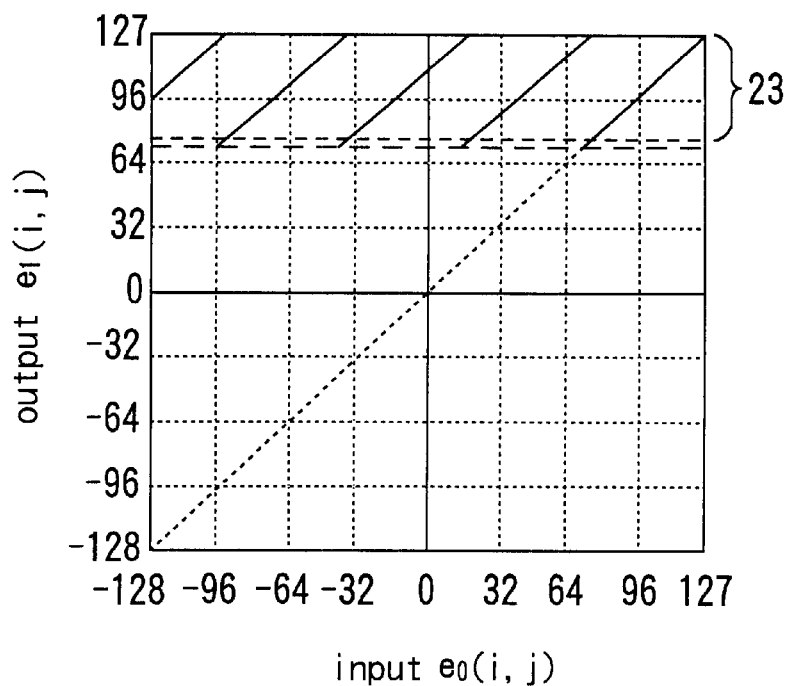
FIG. 9 is a plot for showing the characteristic of the quantization error converter shown in FIG. 8.

FIG. 9 is a plot for showing an example of the relationship between quantization error $e_0(i, j)$ inputted to the quantization error converter 14 and quantization error $e_1(i, j)$ outputted from the converter 14 wherein the quantization level after quantization is '255'. In the example, quantization error $e_0(i, j)$ is converted at the quantization error converter 14 into quantization error $e_1(i, j)$ that falls within the range between '71.0' and '127.0' inclusive. To be specific, quantization error $e_0(i, j)$ is converted at the converter 14 into quantization error $e_1(i, j)$ as expressions (6-1) to (6-5) below wherein the quantization level after quantization is '255'. In the following expressions $e_0(i, j)$ and $e_1(i, j)$ are each represented by $e_0$ and $e_1$, respectively.

$$e_1 = e_0 + 4 \times 56, \text{ where } -128 \le e_0 < -97 \quad (6\text{-}1)$$

$$e_1 = e_0 + 3 \times 56, \text{ where } -97 \le e_0 < -41 \quad (6\text{-}2)$$

-continued $$e_1 = e_0 + 2 \times 56, \text{ where } -41 \le e_0 < 15 \quad (6\text{-}3)$$

$$e_1 = e_0 + 56, \text{ where } 15 \le e_0 < 71 \quad (6\text{-}4)$$

$$e_1 = e_0, \text{ where } 71 \le e_0 \le 127 \quad (6\text{-}5)$$

Figure 10:
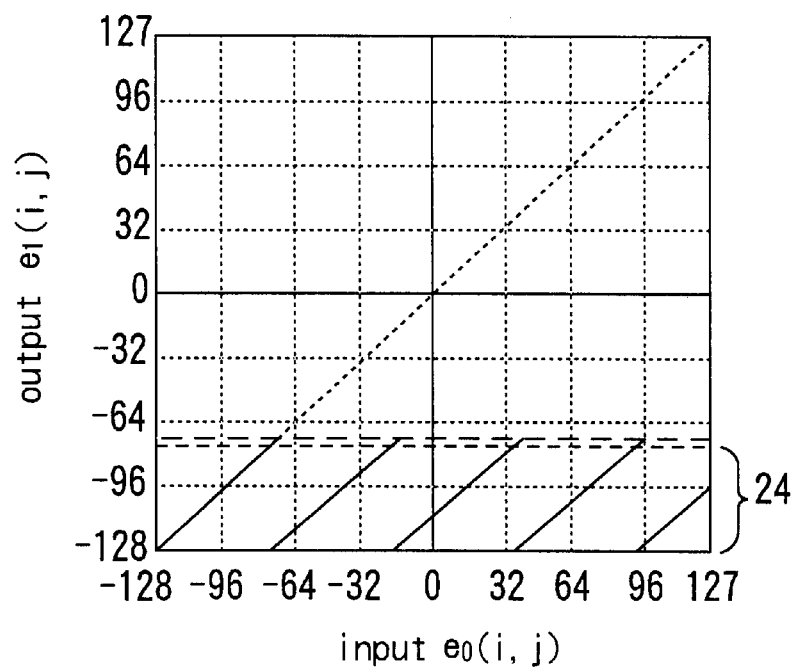
FIG. 10 is a plot for showing the characteristic of the quantization error converter shown in FIG. 8.

FIG. 10 is a plot for showing an example of the relationship between quantization error $e_0(i, j)$ inputted to the quantization error converter 14 and quantization error $e_1(i, j)$ outputted from the converter 14 wherein the quantization level after quantization is '0'. In the example, quantization error $e_0(i, j)$ is converted at the quantization error converter 14 into quantization error $e_1(i, j)$ that falls within the range between '−128.0' and '−72.0' inclusive. To be specific, quantization error $e_0(i, j)$ is converted at the converter 14 into quantization error $e_1(i, j)$ as expressions (7-1) to (7-5) below wherein the quantization level after quantization is '0'. In the following expressions $e_0(i, j)$ and $e_1(i, j)$ are each represented by $e_0$ and $e_1$, respectively.

$$e_1 = e_0, \text{ where } -128 \le e_0 \le -72 \quad (7\text{-}1)$$

$$e_1 = e_0 - 56, \text{ where } -72 < e_0 \le -16 \quad (7\text{-}2)$$

$$e_1 = e_0 - 2 \times 56, \text{ where } -16 < e_0 \le 40 \quad (7\text{-}3)$$

$$e_1 = e_0 - 3 \times 56, \text{ where } 40 < e_0 \le 96 \quad (7\text{-}4)$$

$$e_1 = e_0 - 4 \times 56, \text{ where } 96 < e_0 \le 127 \quad (7\text{-}5)$$

The range within which quantization error $e_1(i, j)$ after conversion at the quantization error converter 14 falls is set to a range including a range in which quantization error $e_0(i, j)$ converges in the steady state when error diffusion processing is performed based on quantization error $e_0(i, j)$ that is not converted at the quantization error converter 14. The range in which quantization error $e_0(i, j)$ converges in the steady state is determined by actually performing error diffusion processing on an original image including a wide range of gradation values and measuring quantization errors thereby produced. Numeral 23 of FIG. 9 and numeral 24 of FIG. 10 each indicate the range in which quantization error $e_0(i, j)$ converges in the steady state. The range 23 of FIG. 9 may be between '76' and '127' inclusive. The range 24 of FIG. 10 may be between '−128' and '−77' inclusive.

If the range within which quantization error $e_1(i, j)$ after conversion falls is narrower than the range in which quantization error $e_0(i, j)$ converges in the steady state, dots or white dots more than those generated in the steady state are generated and the gradation of the original image may be changed, which is not preferred.

The outline of the image processing method of the embodiment will now be described. The method is to reduce time required for accumulated errors to reach the threshold value by constantly maintaining the magnitude (absolute value) of quantization error at a specific level or above in order to resolve the dot delay phenomenon and the tailing phenomenon. The method utilizes the fact that the dynamics of a quantization error converge within a specific range in the steady state. Accordingly, in the embodiment, quantization error $e_0(i, j)$ is converted into quantization error $e_1(i, j)$ at the quantization error converter 14 so that quantization error $e_1(i, j)$ after conversion falls within a specific range in order to maintain the magnitude (absolute value) of the quantization error at a specific level or above. The specific range within which quantization error $e_1(i, j)$ after conversion falls is set to a range including a range in which quantization error $e_0(i, j)$ converges in the steady state when error diffusion processing is performed based on quantization error $e_0(i, j)$ that is not converted at the quantization error converter 14.

The operation of the image processing apparatus 10 of the embodiment will now be described. The description applies to the image processing method of the embodiment as well.

In the image processing apparatus 10 data outputted from the filter 15 is subtracted from input image data $x(i, j)$ at the subtracter 11. Data outputted from the subtracter 11 is quantized at the quantizer 12. Data outputted from the quantizer 12 is outputted as output image data $y(i, j)$ from the image processing apparatus 10. Furthermore, the data outputted from the subtracter 11 is subtracted from the data outputted from the quantizer 12 at the subtracter 13 to produce quantization error $e_0(i, j)$. Quantization error $e_0(i, j)$ as data outputted from the subtracter 13 is inputted to the quantization error converter 14 wherein quantization error $e_0(i, j)$ is converted into quantization error $e_1(i, j)$ within a specific range determined for each quantization level, based on the quantization level after quantization at the quantizer 12. Quantization error $e_1(i, j)$ as data outputted from the quantization error converter 14 is inputted to the filter 15 where filtering processing is performed represented by transfer function $G(z_1, z_2)$. Data outputted from the filter 15 is inputted to the subtracter 11.

Through the operation, the image processing apparatus 10 performs error diffusion processing wherein input image data $x(i, j)$ is quantized based on the single threshold value and converted into output image data $y(i, j)$ having either of the two quantization levels. Quantization error $e_1(i, j)$ into which quantization error $e_0(i, j)$ resulting from the quantization is converted at the converter 14 is diffused into input image data of unquantized pixels near the target pixel.

Three examples of methods will now be described for converting quantization error $e_0(i, j)$ into quantization error $e_1(i, j)$ at the quantization error converter 14. The first example is the method wherein addition of a specific value to or subtraction of the value from quantization error $e_0(i, j)$ before conversion is repeated until quantization error $e_1(i, j)$ after conversion falls within a specific range if quantization error $e_0(i, j)$ is outside the specific range. The specific value added or subtracted is '56' in order to perform conversion as shown in FIG. 9 and FIG. 10.

In the method of the second example, the entire range of quantization error $e_0(i, j)$ before conversion is divided into a plurality of regions. If quantization error $e_0(i, j)$ is outside a specific range, a specific value determined for each region is added to or subtracted from quantization error $e_0(i, j)$ in accordance with the region quantization error $e_0(i, j)$ belongs to. The quantization error is thereby converted so that quantization error $e_1(i, j)$ falls within the specific range. In order to perform conversion as shown in FIG. 9 and FIG. 10, computations of expressions (6-1) to (6-5) and (7-1) to (7-5) are performed in the second example. The specific value defined for each region is an integral multiple of '56'.

The method of the example is to perform quantization error conversion based on the relationship between quantization error $e_0(i, j)$ before conversion and quantization error $e_1(i, j)$ after conversion stored in a read only memory (ROM), for example.

Any of the foregoing three examples may be implemented in the form of hardware through forming dedicated circuitry or in the form of software through the use of a microcomputer and the like.

Figure 1:
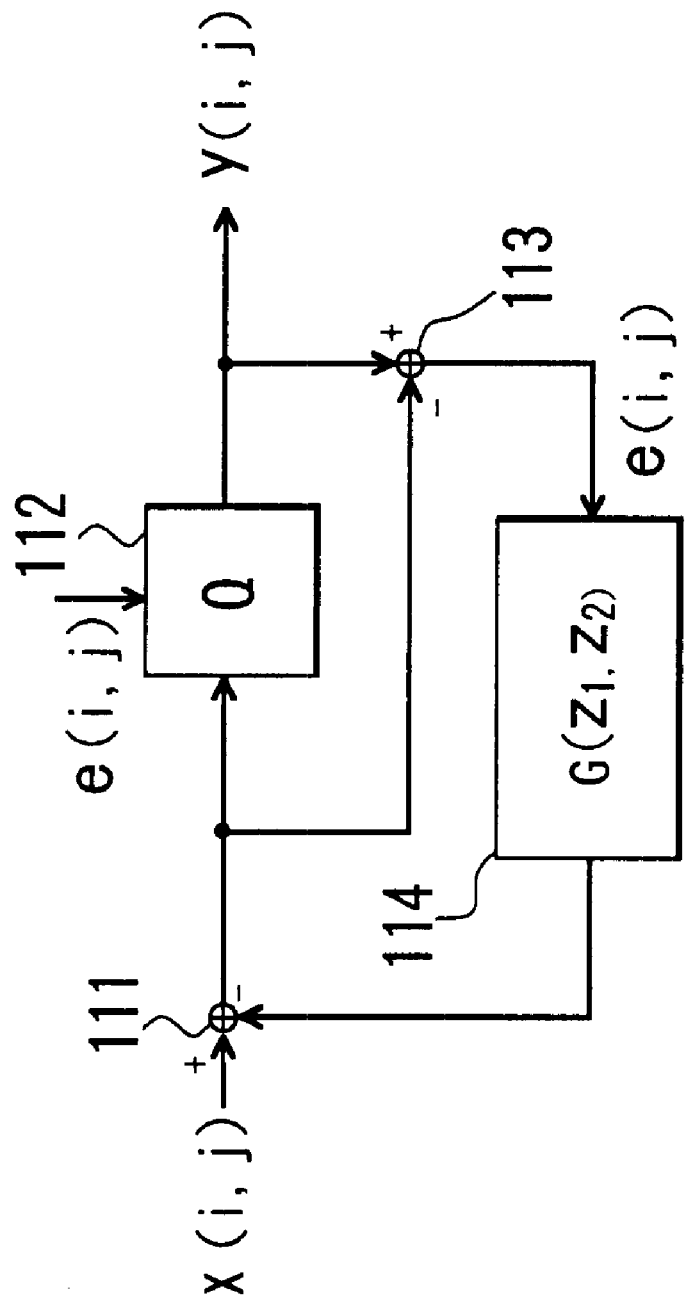
FIG. 1 is a block diagram of an image processing apparatus for implementing typical error diffusion processing of related art.
Figure 2:
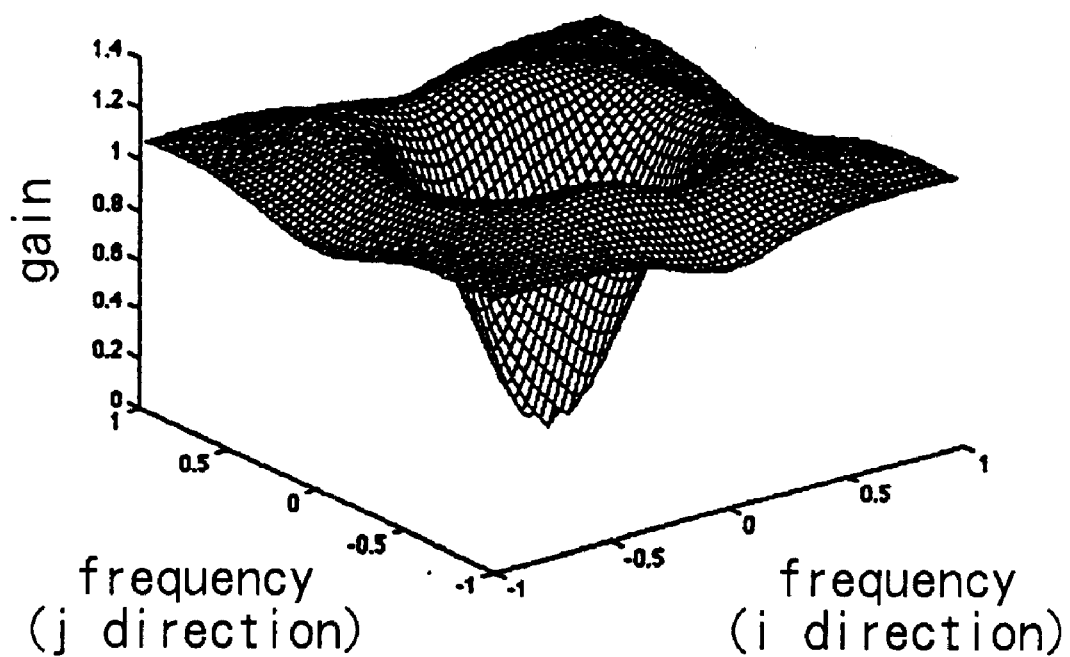
FIG. 2 is a plot for showing an example of the frequency characteristic of a filter used in the image processing apparatus shown in FIG. 1.
Figure 11:
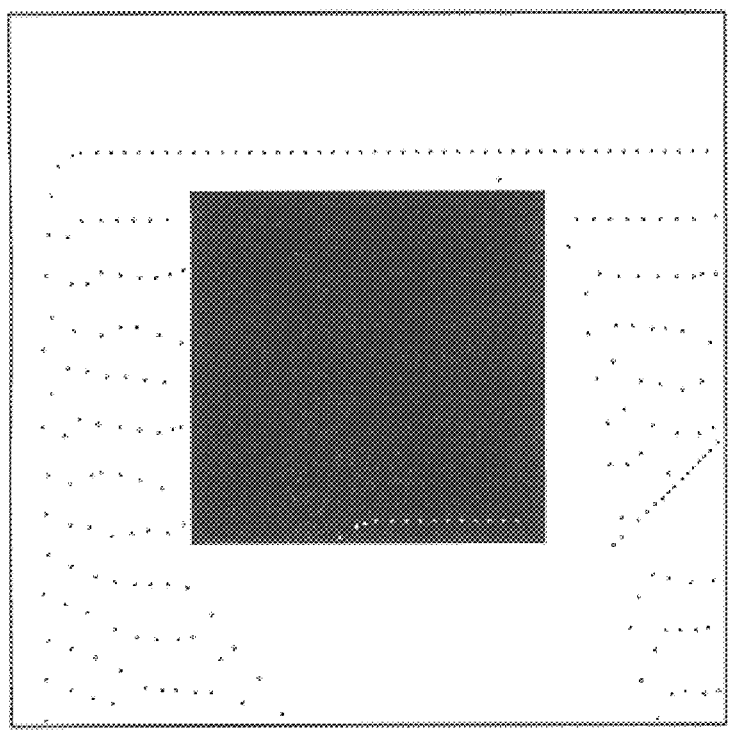
FIG. 11 shows an example of an image obtained through the typical error diffusion method to be compared with the first embodiment of the invention.
Figure 12:
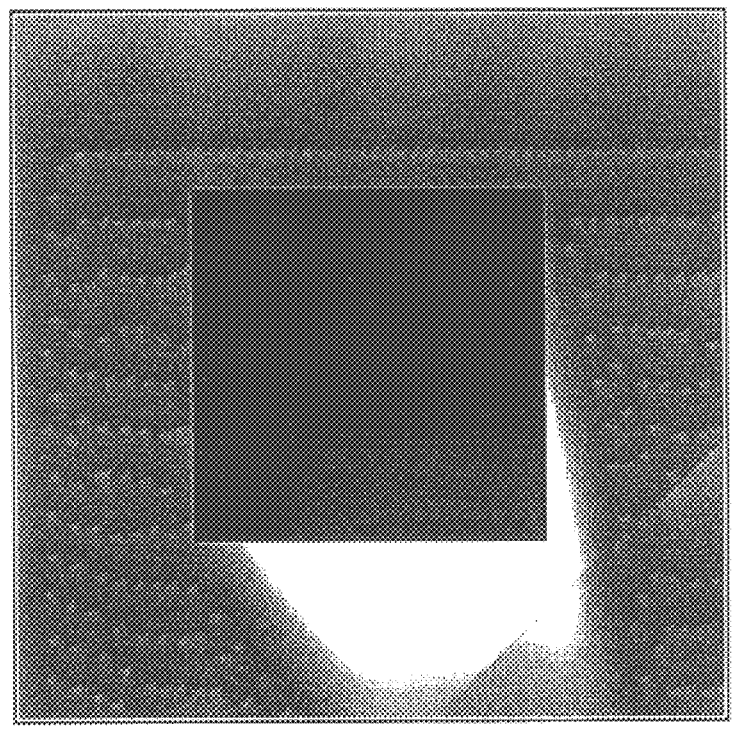
FIG. 12 shows data before quantization for obtaining the image shown in FIG. 11.

The effects of the image processing method and apparatus of the embodiment will now be described. FIG. 11 shows an example of an image obtained through the typical error diffusion method to be compared with the embodiment of the invention. To be specific, FIG. 11 shows the image obtained through reducing the quantization levels of the input image data shown in FIG. 3 to two of '0' and '255', using the image processing apparatus shown in FIG. 1, wherein the threshold value of the quantizer 112 is '128'. A Jarvis' filter is used as the error modulation filter. FIG. 12 shows data before quantization (data inputted to the quantizer 112) for obtaining the image shown in FIG. 11.

FIG. 12 well illustrates the way quantization errors are accumulated. Attention being focused on the region where the dot delay phenomenon and the tailing phenomenon occur in FIG. 12, accumulation of errors to reach the threshold value and generation of dots or white dots are delayed since the magnitude of error produced in each pixel is small. In the region where the tailing phenomenon occurs, it is noted that the errors accumulated in the rectangular region in the center remain after processing of the rectangular region is completed and it takes a long period of time to cancel out the accumulated errors. What is common to the regions where such dot delay phenomenon and tailing phenomenon occur is that the gradation values of the data before quantization remain the levels near the gradation values of the original image for a while immediately after processing proceeds to the region since accumulated errors are still small.

Attention being focused on the region where the dots are constantly generated in the background in FIG. 11, although the region is originally almost white, repeated variations of gray data are generated with stability due to accumulated errors in the data before quantization shown in FIG. 12. That is, when quantization errors accumulated from the top left part reach the threshold value of the quantizer and generation of dots or white dots is started, the quantization errors converge within a range greater than a specific magnitude. This is the error convergence characteristic pertinent to the error diffusion processing. The characteristic similarly applies to every gradation value. Accordingly, accumulated errors which are still small are forcedly placed in the convergence range mentioned above so that generation of dots or white dots is hastened. As a result, the dot delay phenomenon and the tailing phenomenon are resolved. This is the principle of the image processing method of the embodiment of the invention.

Figure 13:
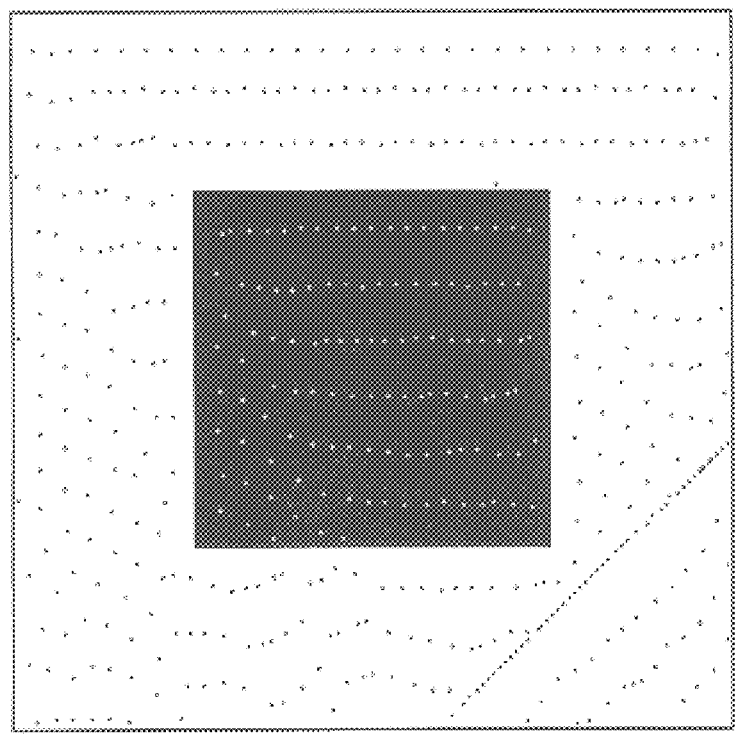
FIG. 13 shows an example of an image obtained through the image processing method and apparatus of the first embodiment of the invention.
Figure 14:
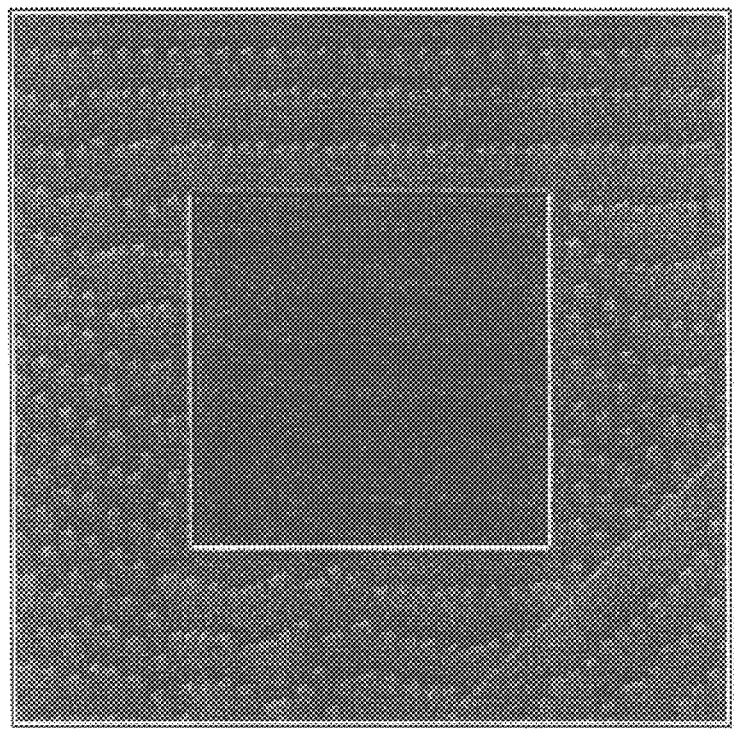
FIG. 14 shows data before quantization for obtaining the image shown in FIG. 13.

FIG. 13 shows an example of an image obtained through the image processing method and apparatus of the embodiment of the invention. To be specific, FIG. 13 shows the image obtained through reducing the quantization levels of the input image data shown in FIG. 3 to two of '0' and '255', using the image processing apparatus 10 shown in FIG. 8, wherein the threshold value of the quantizer 12 is '128'. A Jarvis' filter is used as the error modulation filter. FIG. 14 shows data before quantization (data inputted to the quantizer 12) for obtaining the image shown in FIG. 13. As shown in FIG. 13, it is noted that the dot delay phenomenon and the tailing phenomenon are resolved. As shown in FIG. 14, it is noted that generation of dots or white dots is not delayed and dots or white dots are evenly distributed since the accumulated errors constantly converge within a specific range.

Figure 3:
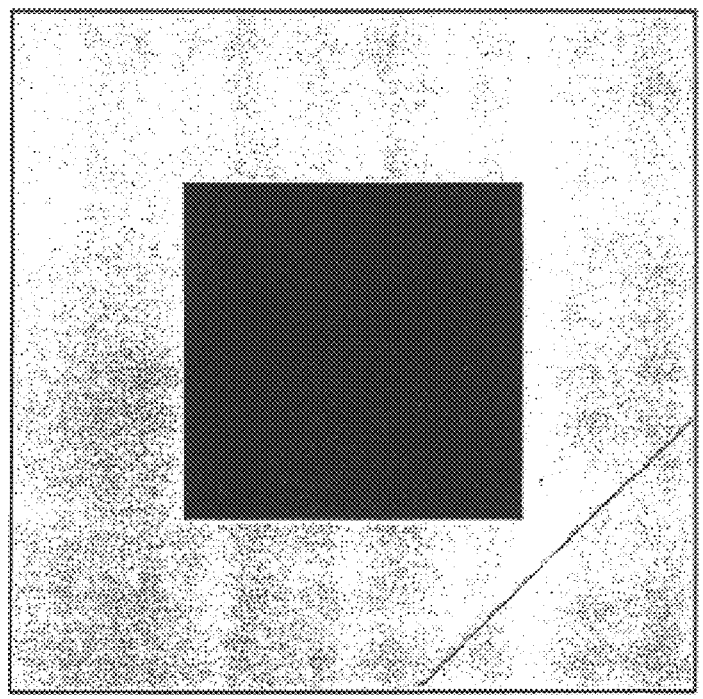
FIG. 3 shows an example of an original image.
Figure 4:
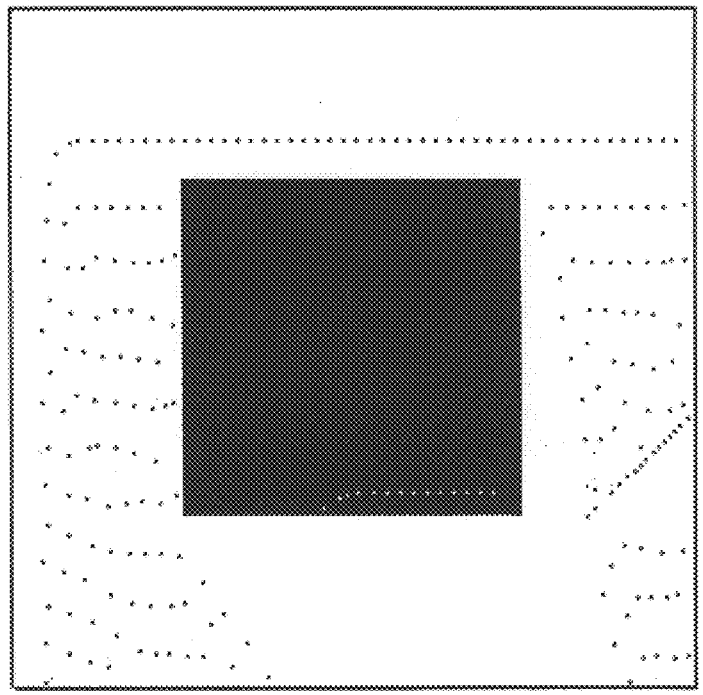
FIG. 4 shows an image produced through performing error diffusion processing on the original image shown in FIG. 3 by the image processing apparatus shown in FIG. 1 so that the gradation levels are reduced to two.
Figure 5:
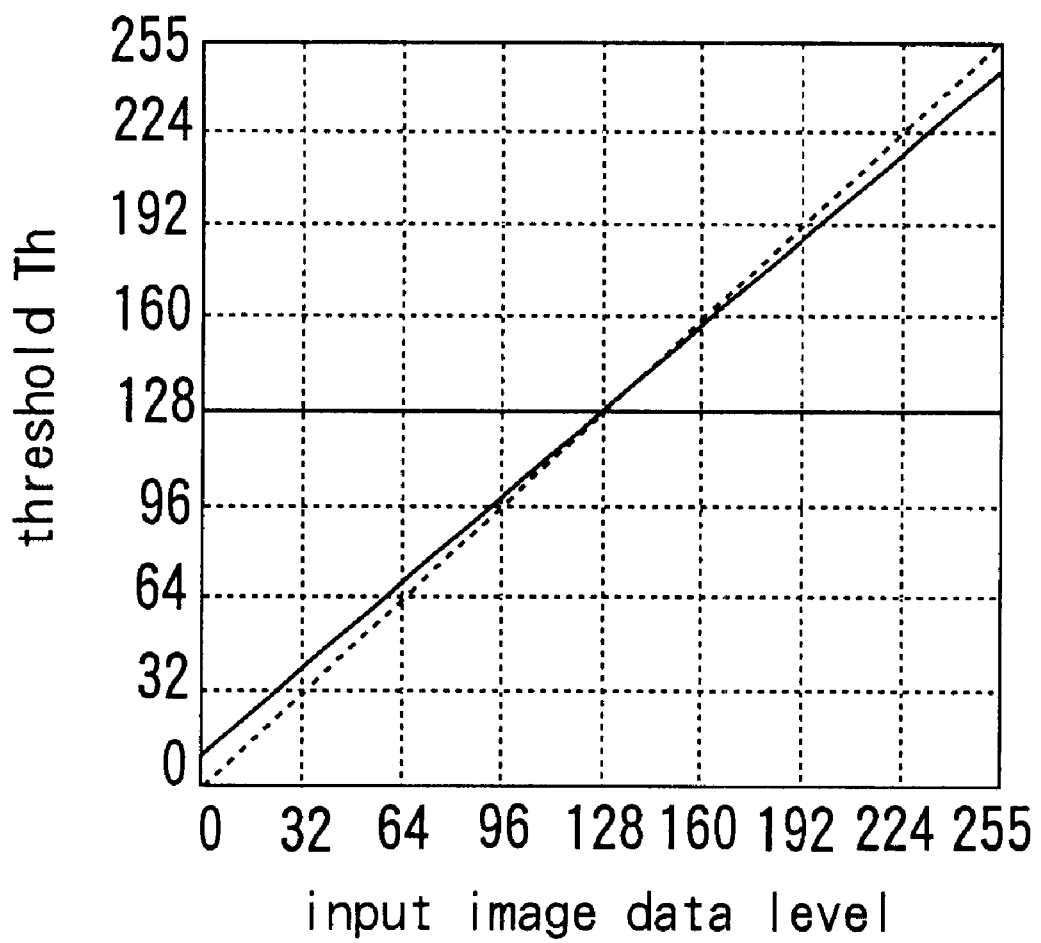
FIG. 5 is a plot for showing an example of the relationship between input image data levels and threshold values in the optimized threshold error diffusion method.
Figure 6:
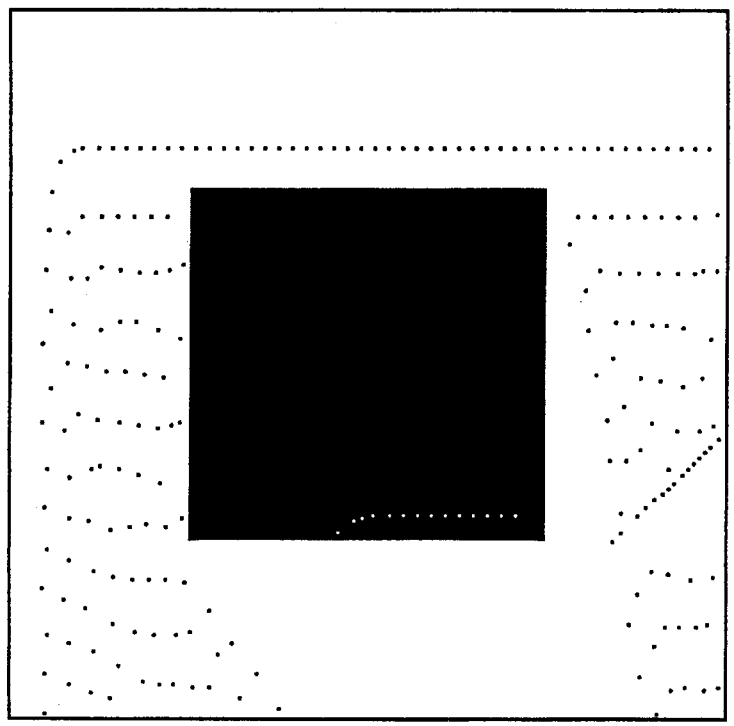
FIG. 6 shows an example of an image obtained through the typical error diffusion method.
Figure 7:
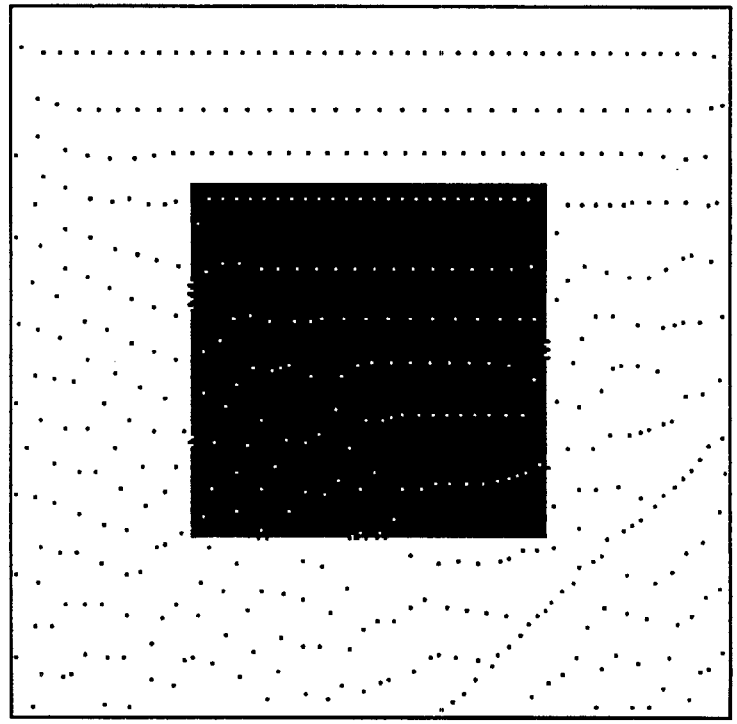
FIG. 7 shows an example of an image obtained through the optimized threshold error diffusion method.
Figure 15:
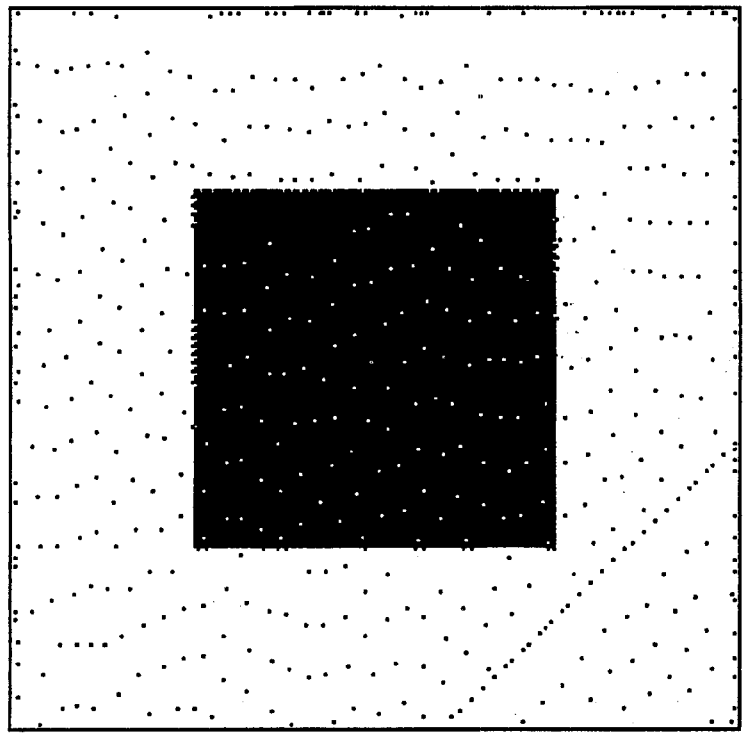
FIG. 15 shows an example of an image obtained through the optimized threshold error diffusion method.
Figure 16:
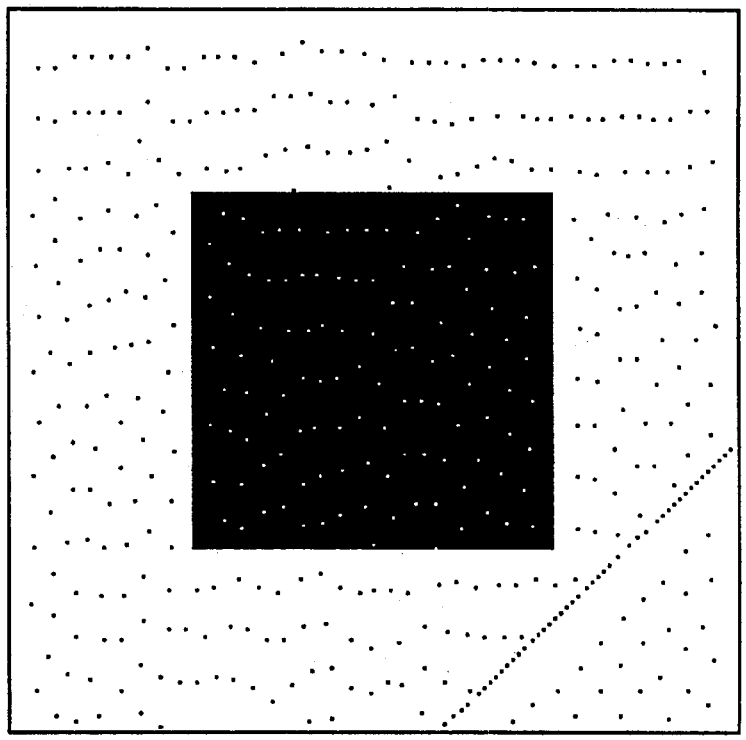
FIG. 16 shows an example of an image obtained through the image processing method and apparatus of the first embodiment of the invention.

Referring to FIG. 15 to FIG. 18, comparison will be made between an image obtained through the optimized threshold error diffusion method and an image obtained through the image processing method and apparatus of the embodiment of the invention. FIG. 15 shows an example of image obtained through the optimized threshold error diffusion method. FIG. 16 shows an example of image obtained through the image processing method and apparatus of the embodiment. In these examples, too, the input image data shown in FIG. 3 is used and a Jarvis' filter is used as the error modulation filter. For obtaining the images shown in FIG. 15 and FIG. 16, end point processing using random numbers is performed and the horizontal scanning direction is reversed for each raster to improve dispersibility of dots. The end point processing using random numbers is, to be specific, to add data that is not obtained from the input image data by giving random numbers in processing of the top end portion, left end portion, and right end portion of the image.

Figure 17:
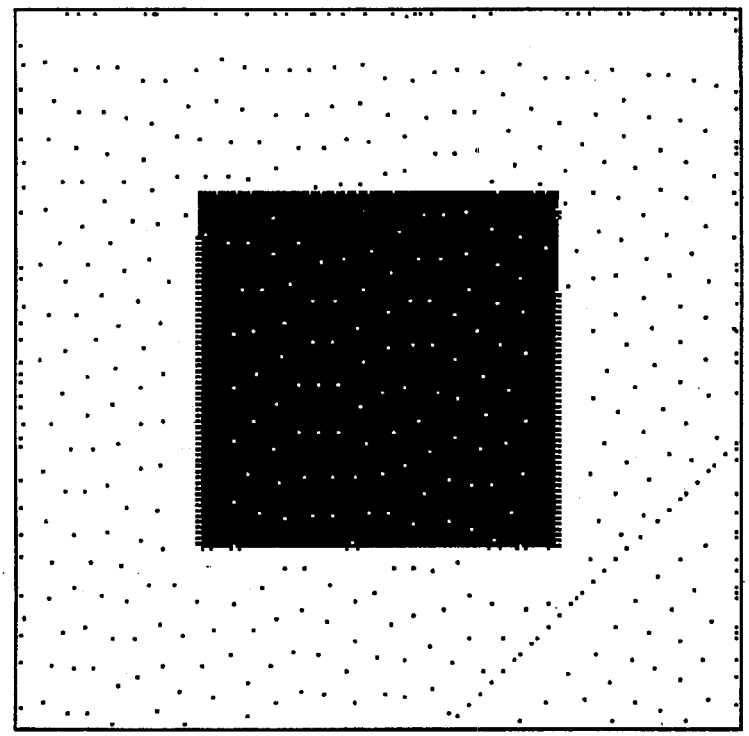
FIG. 17 shows another example of an image obtained through the optimized threshold error diffusion method.
Figure 18:
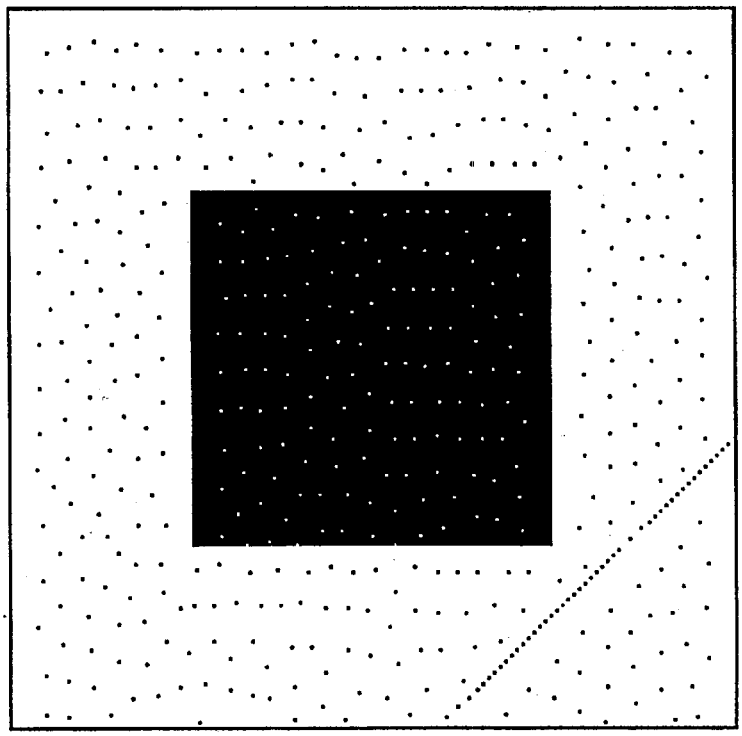
FIG. 18 shows another example of an image obtained through the image processing method and apparatus of the first embodiment of the invention.

FIG. 17 shows another example of image obtained through the optimized threshold error diffusion method. FIG. 18 shows another example of image obtained through the image processing method and apparatus of the embodiment. In these examples, a filter whose coefficient is as represented by expression (8) below is used as the error modulation filter in place of a Jarvis' filter. The response of the filter in the low frequency region is spatially isotropic and the filter achieves the better dot dispersibility, compared to a Jarvis' filter. The remainder of the conditions for obtaining the images shown in FIG. 17 and FIG. 18 are similar to those of FIG. 15 and FIG. 16.

$$g(i, j): \begin{pmatrix} * & 7 & 5 & 3 \\ 3 & 5 & 7 & 7 & 5 & 3 & 1 \\ 0 & 1 & 3 & 3 & 1 & 0 & 0 \end{pmatrix} / 54 \quad (8)$$

As shown in FIG. 15 to FIG. 18, the dot delay phenomenon and the tailing phenomenon are resolved and dots or white dots are evenly distributed in either the image obtained through the optimized threshold error diffusion method or the image obtained through the image processing method and apparatus of the embodiment. However, in the image obtained through the optimized threshold error diffusion method (FIG. 15 and FIG. 17), the edges of the highlight region and the shadow region have jaggies. In the image obtained through the image processing method and apparatus of the embodiment (FIG. 16 and FIG. 18), in contrast, the edges of the highlight region and the shadow region have sharp contours without any jaggies.

According to the image processing method and apparatus of the embodiment thus described, quantization error $e_0(i, j)$ is converted into quantization error $e_1(i, j)$ at the quantization error converter 14 so that the magnitude (absolute value) of the quantization error is constantly maintained at a specific level or above. A period of time required for the accumulated errors to reach the threshold value of the quantizer 12 is thereby reduced. As a result, according to the image processing method and apparatus of the embodiment, not only the dot delay phenomenon and the tailing phenomenon are resolved but also sharp representation of the edge portions of the highlight region and the shadow region is achieved without jaggies. Image quality is thereby maintained. According to the embodiment, sharp representation of an artificial image such as characters and a computer graphics image is achieved without any reduction in image quality. In addition, the embodiment achieves sharp representation of a natural image without blurs.

The image processing method and apparatus of the embodiment are implemented by simply adding very simple processing (the processing of the quantization error converter 14) to the typical error diffusion processing. There is little increase in processing time, compared to the typical error diffusion processing.

Minimized quantization errors are ensured throughout the image in the typical error diffusion method. Because of this, the errors accumulated in a region are cancelled out in the other region beyond the edge and the tailing phenomenon results. That is, the quantization errors are not minimized in a partial region in the entire image according to the typical error diffusion method.

On the other hand, in the optimized threshold error diffusion method, the errors accumulated in a region are cancelled out in the edge portion. This is because the threshold value of the quanitzer substantially changes in the edge portion in a noncontinuous manner. As a result, jaggies result in the edge portion.

In the embodiment of the invention, in contrast to the typical error diffusion method and the optimized threshold error diffusion method, the errors accumulated in a region are not cancelled out but discarded in the edge portion. Therefore, minimized quantization errors are not ensured throughout the image according to the embodiment. However, in terms of image quality, the fact that minimized quantization errors are not ensured throughout the image according to the embodiment is considered to cause no problem since the tailing phenomenon and image distortion such as jaggies in edge portions are caused by canceling out the errors accumulated in a region in the other region beyond the edge or in the edge portion as described above. Since the accumulated errors fall within the convergence range in a region where the gradation gradually changes in the embodiment, the accumulated errors are discarded only in the edge portions where the gradation abruptly changes.

In the embodiment a random error may be superimposed on quantization error $e_0(i, j)$ inputted to the quantization error converter 14. Dispersibility of dots and white dots is thereby improved.

The image processing apparatus of the embodiment may be either provided as a single unit or in a form of integrated circuit and the like incorporated in an image output apparatus such as a printer.

Figure 19:
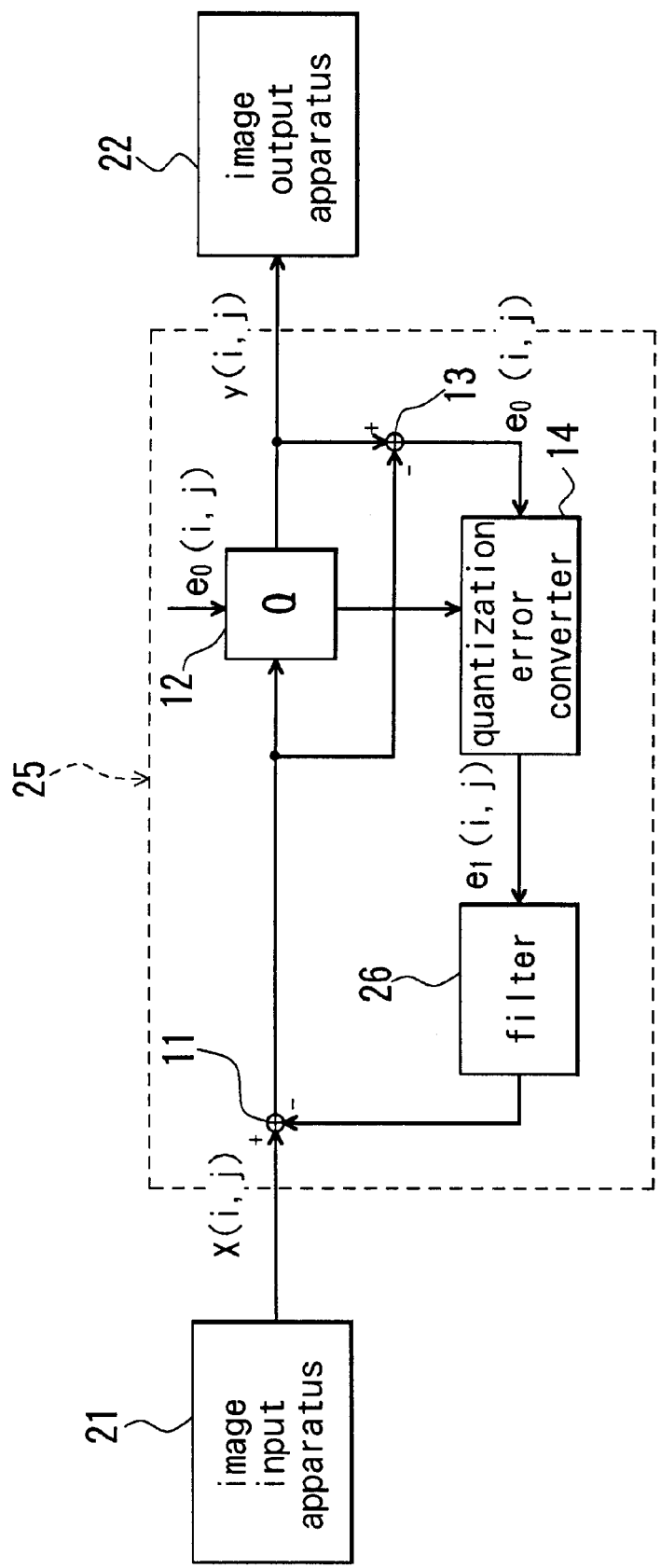
FIG. 19 is a block diagram of an image processing apparatus of a second embodiment of the invention.

FIG. 19 is a block diagram of an image processing apparatus for implementing an image processing method of a second embodiment of the invention. The second embodiment is an example of using the mean error minimization method instead of the error diffusion method. An image processing apparatus 25 of the embodiment is similar to the image processing apparatus 10 of the first embodiment shown in FIG. 8 except that a filter 26 for the mean error minimization method is provided in place of the filter 15. The filter 26 retains quantization errors $e_1(i, j)$ resulting from a plurality of quantized pixels near a target pixel and calculates the mean error by assigning specific weights to the respective quantization errors $e_1(i, j)$ and averaging the errors. The filter 26 then outputs the mean error when input image data of the target pixel is inputted. Such processing is equal to diffusing the quantization error resulting from a target pixel into input image data of unquantized pixels near the target pixel. The filter 26 may be implemented by a digital filter.

The remainder of configuration, operation and effects of the embodiment are similar to those of the first embodiment.

Figure 20:
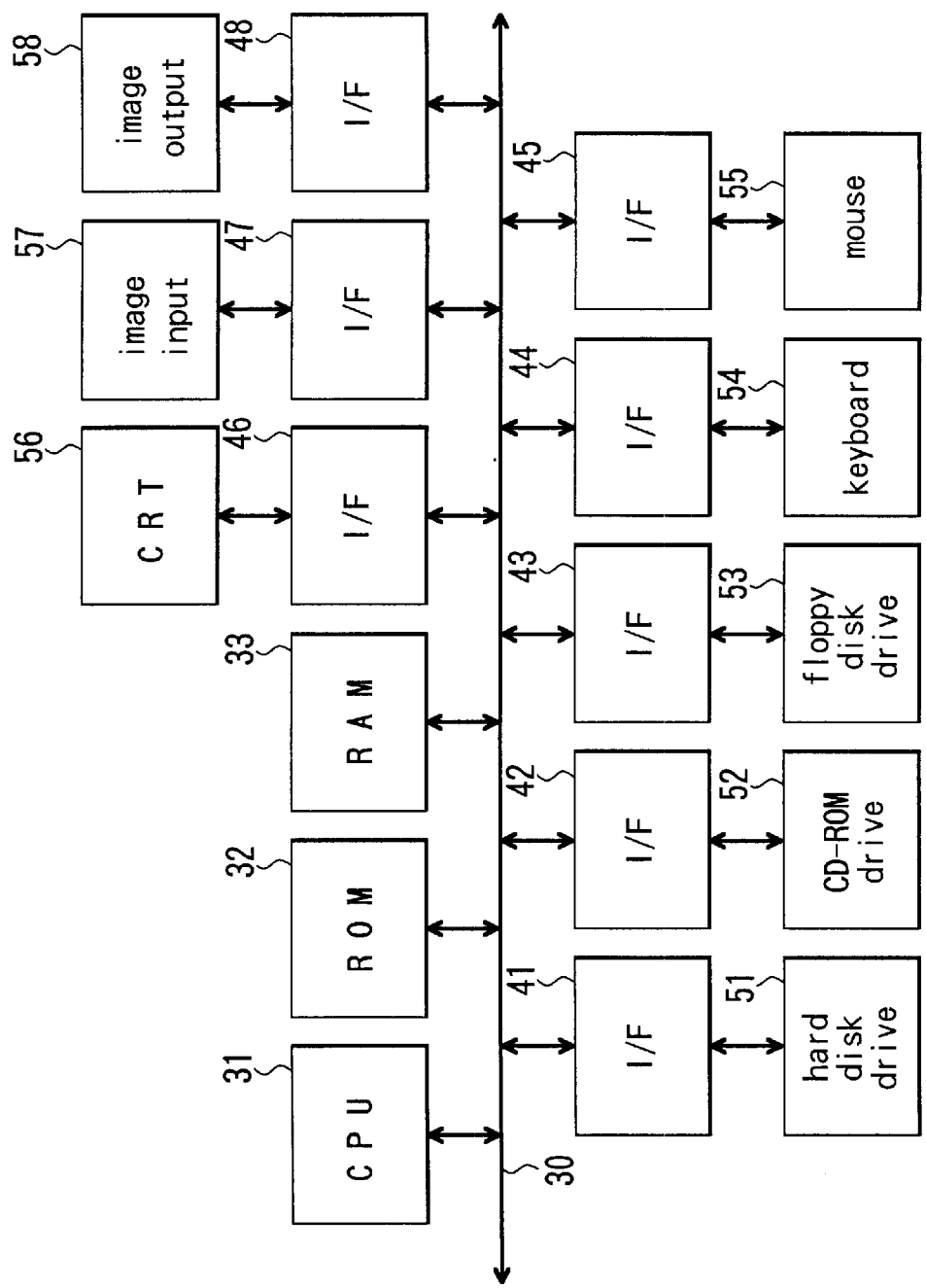
FIG. 20 is a block diagram of an image processing apparatus of a third embodiment of the invention.

FIG. 20 is a block diagram of an image processing apparatus of a third embodiment of the invention. The embodiment is an example of implementation of a function similar to that of the image processing apparatus of the first embodiment in a form of software using a computer.

The image processing apparatus of the embodiment using a computer comprises a central processing unit (CPU) 31, a read only memory (ROM) 32 and a random access memory (RAM) 33, interconnected to one another through a bus 30. The image processing apparatus further comprises a hard disk drive 51, a CD-ROM drive 52, a floppy disk drive 53, a keyboard 54, a mouse 55 and a cathode-ray tube (CRT) 56, each connected to the bus 30 through interfaces 41 to 46. The image processing apparatus further comprises an interface 47 for connecting an image input apparatus 57 to the bus 30 and an interface 48 for connecting an image output apparatus 58 to the bus 30.

The image input apparatus 57 may be any of an image scanner, a digital camera, a video camera and so on. The image output apparatus 58 may be any of a printer, a liquid crystal display and so on.

In the image processing apparatus of the embodiment, the CPU 31 performs the function of the image processing apparatus 10 shown in FIG. 8, through executing an application program stored on any of the hard disk platter in the hard disk drive 51, a CD-ROM driven by the CD-ROM drive 52 and a floppy disk driven by the floppy disk drive 53 with the RAM 33 as a work area.

Through the function implemented as described above, the image processing apparatus of the embodiment performs processing similar to that of the first embodiment on image data inputted by the image input apparatus 57 or image data made in the image processing apparatus (computer). Output image data whose number of gradation levels is reduced is thus produced to be outputted to the image output apparatus 58.

The remainder of operations and effects of the embodiment are similar to those of the first embodiment.

The function similar to that of the image processing apparatus 25 of the second embodiment may be implemented in a form of software using a computer as in the third embodiment.

The present invention is not limited to the embodiments described so far but may be practiced in still other ways within the scope of the invention. For example, the quantization levels, the number of quantization levels, the filter characteristics and so on are those for illustration purposes and may be determined depending on a mode of application of the present invention.

Although input image data is quantized based on a single threshold value and converted into output image data of two gradation levels in the foregoing embodiments, the invention may be applied to the case wherein input image data is quantized based on two threshold values or above and converted into output image data of three gradation levels or above.

The invention is effective for reducing the number of gradation levels of image data to be outputted to an ink-jet printer, a fusing thermal transfer printer, a thermo-autochrome printer, a display for representing fewer gradation levels and so on. In addition, the invention is effective for reducing the number of gradation levels of image data for lessening a load on image processing and storage of image data.

According to the image processing method or apparatus of the invention as described so far, input image data of each of pixels is quantized based on at least one threshold value and converted into output image data having any of at least two quantization levels. A quantization error resulting from quantization is converted into a quantization error within a specific range determined for each of the quantization levels, based on the quantization level after quantization. The quantization error obtained through conversion with respect to a targeted one of the pixels is diffused into input image data of unquantized pixels near the target pixel. As a result, image quality is maintained through simple processing while reducing the number of gradation levels of image data by error diffusion processing.

Obviously many modifications and variations of the present invention are possible in the light of the above teachings. It is therefore to be understood that within the scope of the appended claims the invention may be practiced otherwise than as specifically described.

What is claimed is:

1. An image processing method comprising the steps of:
    quantizing input image data of each of pixels forming entire image data based on at least one threshold value so as to convert the input image data into output image data having any of at least two quantization levels;
    converting a quantization error resulting from quantizing the input image data of each of the pixels in the step of quantizing into a quantization error within a specific range determined for each of the quantization levels, based on the quantization level after quantization; and
    diffusing the quantization error obtained through conversion in the step of converting with respect to a targeted one of the pixels, into input image data of unquantized pixels near the target pixel.

2. An image processing method according to claim 1, wherein the specific range includes a range in which the quantization error resulting from quantizing the input image data of each of the pixels in the step of quantizing would converge to a steady state if only the quantization error resulting from quantizing the input image data of each of the pixels in the step of quantizing was diffused into input image data of unquantized pixels near the target pixels.

3. An image processing method according to claim 1 wherein conversion of the quantization error is performed in the step of converting by repeating addition of a specific value to or subtraction of the value from the quantization error before conversion until the quantization error obtained through conversion falls within the specific range if the quantization error before conversion is outside the specific range.

4. An image processing method according to claim 1 wherein conversion of the quantization error is performed in the step of converting by dividing the entire range of the quantization error before conversion into a plurality of regions and, if the quantization error is outside the specific range, adding a specific value determined for each of the regions to or subtracting the specific value from the quantization error before conversion in accordance with the region in which the quantization error before conversion belongs to, so that the quantization error obtained through conversion falls within the specific range.

5. An image processing method according to claim 1 wherein conversion of the quantization error in the step of converting is performed in accordance with a predetermined relationship between the quantization error before conversion and the quantization error obtained through conversion.

6. An image processing apparatus comprising:
    a means for quantizing input image data of each of pixels forming entire image data based on at least one threshold value so as to convert the input image data into output image data having any of at least two quantization levels;

a means for converting a quantization error resulting from quantizing the input image data of each of the pixels by the means for quantizing into a quantization error within a specific range determined for each of the quantization levels, based on the quantization level after quantization; and a means for diffusing the quantization error obtained through conversion by the means for converting with respect to a targeted one of the pixels, into input image data of unquantized pixels near the target pixel.

7. An image processing apparatus according to claim 6 wherein the specific range includes a range in which the quantization error resulting from quantizing the input image data of each of the pixels by means of quantizing would converge to a steady state if only the quantization error resulting from quantizing the input image data of each of the pixels by means of quantizing was diffused into input image data of unquantized pixels near the target pixels.

8. An image processing apparatus according to claim 6 wherein conversion of the quantization error is performed by the means of converting by repeating addition of a specific value to or subtraction of the value from the quantization error before conversion until the quantization error obtained through conversion falls within the specific range if the quantization error before conversion is outside the specific range.

9. An image processing apparatus according to claim 6 wherein the means for converting performs conversion of the quantization error by dividing the entire range of the quantization error before conversion into a plurality of regions and, if the quantization error is outside the specific range, adding a specific value determined for each of the regions to or subtracting the specific value from the quantization error before conversion in accordance with the region in which the quantization error before conversion belongs to, so that the quantization error obtained through conversion falls within the specific range.

10. An image processing apparatus according to claim 6 wherein the means for converting conversion performs conversion of the quantization error in accordance with a predetermined relationship between the quantization error before conversion and the quantization error obtained through conversion.

* * * * *